(12) United States Patent
Ash et al.

(10) Patent No.: US 8,980,395 B2
(45) Date of Patent: Mar. 17, 2015

(54) COMPOSITE PARTS JOINED BY A FLEXIBLE CONSTRUCT

(75) Inventors: Timothy L. Ash, Lithia Springs, GA (US); Louis Aúgusta Girard, Jr., Uniontown, OH (US); Dennis Keith Moxley, Dallas, GA (US)

(73) Assignee: Meggitt (Rockmart) Inc., Rockmart, GA (US)

( * ) Notice: Subject to any disclaimer, the term of this patent is extended or adjusted under 35 U.S.C. 154(b) by 241 days.

(21) Appl. No.: 13/401,005

(22) Filed: Feb. 21, 2012

(65) Prior Publication Data
US 2013/0216756 A1 Aug. 22, 2013

(51) Int. Cl.
*B32B 3/04* (2006.01)
*B29C 65/48* (2006.01)

(52) U.S. Cl.
USPC .................................. 428/57; 428/53; 428/60

(58) Field of Classification Search
USPC ............................................. 428/57, 53, 60
See application file for complete search history.

(56) References Cited

U.S. PATENT DOCUMENTS

2012/0174748 A1* 7/2012 Landi ........................ 89/36.02

* cited by examiner

*Primary Examiner* — Brent O'Hern
(74) *Attorney, Agent, or Firm* — Renner Kenner Greive Bodak Taylor & Weber

(57) ABSTRACT

A composite part includes a first composite section and a second composite section connected by a flexible section. The first composite section has a laminated structure including multiple layers of reinforcement material supported by a matrix material. The second composite section has a laminated structure including multiple layers of reinforcement material supported by a matrix material, and a flexible composite section joins the first composite section to the second composite section. The flexible composite includes multiple layers of a fabric material supported by a flexible elastomer. The multiple layers of the fabric material overlap with the first composite section and the second composite section by being layered in between at least a portion of the multiple layers of reinforcement material forming the laminated structures of the first composite section and the second composite section.

11 Claims, 2 Drawing Sheets

COMPOSITE PARTS JOINED BY A FLEXIBLE CONSTRUCT

FIELD OF THE INVENTION

The present invention generally relates to composite parts. More particularly, this invention relates to composite parts joined together by a flexible section. This invention also relates to a method for creating composite parts joined by a flexible section.

BACKGROUND OF THE INVENTION

Composite materials or "composites" of interest in this application are generally well-known engineered materials that typically consist of a reinforcement component and a matrix material. To form a composite, at least one reinforcement component and at least one matrix material is required. The matrix material surrounds and supports the reinforcement component to provide an end composite where the reinforcement component and the matrix material remain separate and distinct on a macroscopic level. Together, the reinforcement component and the matrix material produce a composite having properties different from the individual constituent materials. Although composites can be made from fibrous and aggregate-type reinforcement components dispersed in appropriate matrix materials, for example, as in steel/aggregate reinforced cement/concrete, this invention is more particularly focused on the improvement of composites that employ sheet-like reinforcement components.

Composites made from sheet-like reinforcement components are also well-known, and can be created through a variety of molding methods wherein the matrix material is caused to surround and impregnate the sheet-like material before being cured or otherwise solidified to create the composite end product. A cloth of woven carbon fiber filaments is a common sheet-like reinforcement component, and polymers are common matrix materials.

Composites are now commonly used for creating a number of different body structures where high strength and stiffness to weight ratios are the overwhelming design concern. For example, carbon-epoxy composite parts are now commonly used for aircraft body structures, where their high strength to weight ratio directly increases the load carrying capability of a given aircraft. The strength/weight benefits of the composites could not be taken advantage of if stiffness were sacrificed. Whether it is a bicycle, car, boat or aircraft, high stiffness of the overall body is necessary to avoid dynamic problems and achieve peak performance.

While the high strength and stiffness to weight capability of composite materials has been widely used to improve general vehicle performance, there are niche applications where low stiffness is desired. For example, in many circumstances it is desired to structurally mount an aircraft engine and inlets separately to the airframe. This arrangement resolves immediate structural needs of the inlet and engine, but causes a sealing issue at the interface. Inevitably, the engine and inlet will displace differently in response to aircraft loads. To deal with this relative motion, rubber seals have been used, but durability and design problems are plentiful. The relative motion tends to wear out the seals and in worst case scenarios, a seal can be sucked into the engine leading to much bigger problems. Seal designs that are successful tend to require substantial mounting features which have noticeable weight penalties.

For all of these reasons, a better compliant joint is desired. This joint will ideally be structurally incorporated into the existing components without the need of fasteners, flanges or other attachment mechanism which add weight. The invention presented herein, describes a compliant joint and its method of production which satisfies these requirements.

SUMMARY OF THE INVENTION

In accordance with one embodiment of this invention, a composite part is provided. This composite part includes a first composite section having a laminated structure including multiple layers of reinforcement material supported by a matrix material. A composite part further includes a second composite section having a laminated structure including multiple layers of reinforcement material supported by a matrix material, and a flexible composite section joins the first composite section to the second composite section. The flexible composite includes multiple layers of a fabric material supported by a flexible elastomer. The multiple layers of the fabric material overlap with the first composite section and the second composite section by being layered in between at least a portion of the multiple layers of reinforcement material forming the laminated structures of the first composite section and the second composite section.

In a particular embodiment, the first composite section includes a first layer of reinforcement material, a second layer of reinforcement material and a third layer of reinforcement material, while the second composite section includes a first layer of reinforcement material, a second layer of reinforcement material and a third layer of reinforcement material. The flexible composite section includes a first layer of fabric material and a second layer of fabric material, and the first layer of fabric material overlaps with and lies between the first and second layers of reinforcement material of the first composite section and overlaps with and lies between the first and second layers of reinforcement material of the second composite section, while the second layer of fabric material overlaps with and lies between the second and third layers of reinforcement material of the first composite section and overlaps with and lies between the second and third layers of reinforcement material of the second composite section.

This invention also provides a process for the production of a composite part having a flexible section. The process includes the steps of: forming a pre-melded first composite section of laminated structure by introducing multiple layers of reinforcement material to a first composite mold portion; forming a pre-melded second composite section of laminated structure by introducing multiple layers of reinforcement material to a second composite mold portion; forming a pre-melded flexible section extending between the pre-melded first composite section and the pre-melded second composite section by positioning multiple layers of fabric material to overlap with the multiple layers of reinforcement material of the pre-melded first composite section and the multiple layers of reinforcement material of the pre-melded second composite section; and, after the above forming steps, subjecting the pre-melded first composite section, the pre-melded composite second section and the pre-melded flexible section to a melding event to form a composite part having a first composite section joined to a second composite section by a flexible section.

DETAILED DESCRIPTION OF ILLUSTRATIVE EMBODIMENTS

Figure 1:
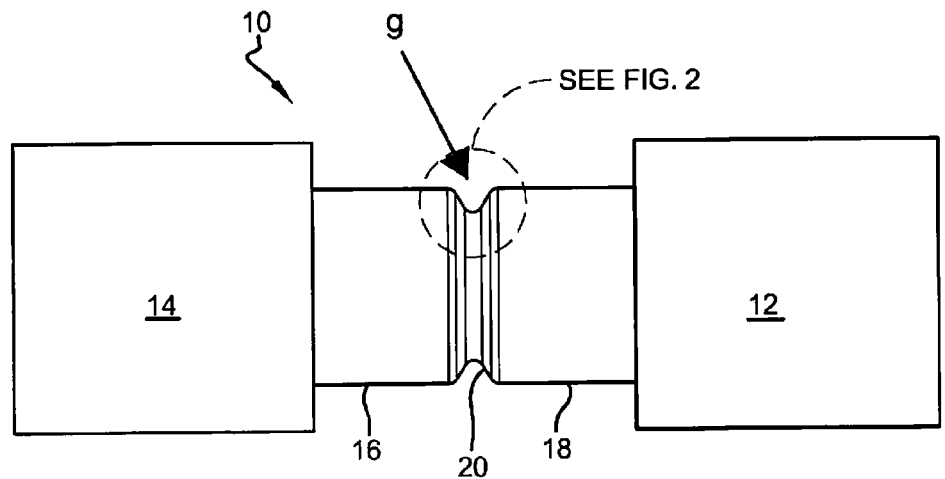
FIG. 1 is a general schematic view of a particular embodiment of a composite part having a flexible section in accordance with this invention, the composite shown connected between a helicopter engine and a helicopter frame.

Reference now to FIG. 1, it can be seen that a particular exemplary embodiment of a composite part having a flexible section in accordance with this invention is shown and designated by the numeral 10 (herein "the composite part 10"). The composite part 10 is connected between the engine 12 of a helicopter and the frame 14 of the helicopter. The composite part 10 includes a first composite section 16 and a second composite section 18 separated by a gap g that is spanned by a flexible composite section 20 to join the first composite section 16 and second composite section 18. A schematic cross sectional view of section 20 is provided in FIG. 2, and an alternative embodiment thereof is shown in schematic cross section in FIG. 3 and numbered as composite section 120.

The composite sections employed in this invention and adapted to include a flexible composite section in accordance with the teaching herein are generally selected from continuous reinforced materials constituting a layered or laminated structure. As seen in the cross-section of FIG. 2, the first composite section 16 and the second composite section 18 have a laminated structure including multiple layers of reinforcement material supported by a matrix material. More particularly, the first composite section 16 includes a first layer of reinforcement material 22a, a second layer of reinforcement material 22b, a third layer of reinforcement material 22c and a fourth layer of reinforcement material 22D. These layers of reinforcement material 22a, 22b, 22c and 22d are sheet-like reinforcement materials, as generally connoted by the term "layers." Each of these layers of reinforcement material 22a, 22b, 22c and 22d are covered and impregnated with a matrix material 24, schematically represented by the diagonal lines numbered 24. Similarly, the second composite section 18 includes a first layer of reinforcement material 26a, a second layer of reinforcement material 26b, a third layer of reinforcement material 26c and a fourth layer of reinforcement material 26D. These layers of reinforcement material 26a, 26b, 26c and 26d are sheet-like reinforcement materials, as generally connoted by the term "layers." Each of these layers of reinforcement material 26a, 26b, 26c and 26d are covered and impregnated with a matrix material 24, similarly schematically represented.

The layers of reinforcement material 22a, 22b, 22c and 22d of the first composite section 16 and the layers of reinforcement material 26a, 26b, 26c and 26d of the second composite section 18 may be chosen from virtually any sheet-like material now or hereinafter commonly employed in composite structures. By way of non-limiting example, various layers of reinforcement material can be provided by sheet-like, woven or non-woven layers of fiberglass, aramid or para-aramid fibers (e.g., Kevlar™), carbon fibers, nylon, polyethylene, quartz, ceramic, PBO, boron, basalt and natural fibers such as hemp, jute, and flax. Each of the multiple layers of reinforcement material may be the same or different. Each may be woven or non-woven, and woven materials might take any particular type of weave, plain, satin, braded, stitched, etc, without limitation. Each reinforcing layer may be the same or different, and will be chosen for desired properties.

Though described as layers or sheet-like, it should be appreciated that these layers or sheets can be formed into and/or made to conform with various shapes. Notably, the embodiment shown in FIG. 1 has layers formed to create a general tube shape.

The matrix material 24 may be selected from various polymer matrix materials. In particular embodiments, the polymer matrix material is a thermoset polymeric matrix material. In other embodiments, the polymer matrix material is a thermoplastic polymeric matrix material. As non-limiting examples, the matrix material may be selected from epoxy, polyester, vinyl ester resin, phenolic esters and cyanate esters. The matrix material covering and impregnating any given layer may be the same or different from the matrix material covering and impregnating any other layer.

In particular embodiments, the reinforcement material is a woven or non-woven carbon fiber, and the matrix material is an epoxy.

Figure 2:
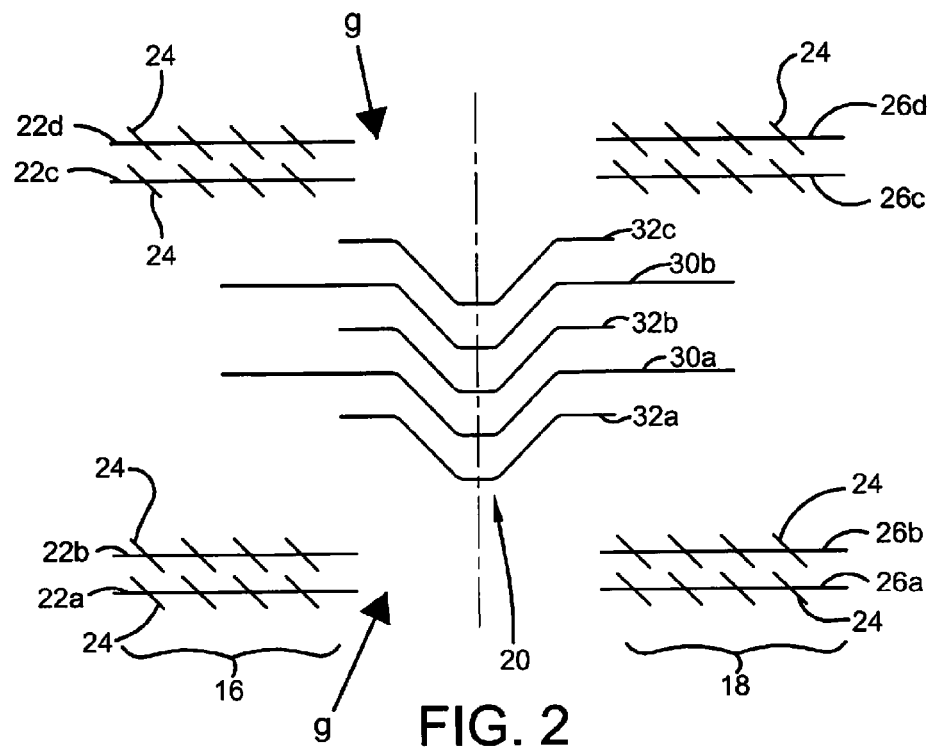
FIG. 2 is a schematic cross-sectional view of a relevant portion of the composite part with flexible section of FIG. 1.

The first composite section 16 and the second composite section 18 are separated by a gap g that is spanned by a flexible composite section 20 to join the first composite section 16 to the second composite section 18. The flexible composite section 20 is an elastomer-reinforced fabric section, wherein multiple layers of the fabric overlap with both the first composite section 16 and the second composite section 18. In FIG. 2, the flexible composite section 20 includes a first elastomer layer 32a, a first fabric layer 30a, a second elastomer layer 32b, a second fabric layer 30b, and a third elastomer layer 32c. These layers are laid up to extend between the 22b and 22c layers of reinforcement material of the first composite section 16 and between the 26b and 26c layers of reinforcement material of the second composite section 18. After processing (melding event discussed more further below), the elastomer layers cover and impregnate the fabric layers, as with the composite sections at 16 and 18.

The fabric layers (e.g. 30a, 30b etc) may be selected from sheet-like, woven or non-woven layers of fiberglass, polyamide, aramid or para-aramid fibers (e.g., Kevlar™, Nomex™), carbon fibers, nylon, polyethylene, polyester, quartz, ceramic, PBO, boron, basalt and natural fibers such as hemp, jute, and flax. In particular embodiments, the fabric layers are selected from fiberglass and carbon fiber fabrics. Each of the multiple layers of the fabric may be chosen to be the same or different, and will be chosen for desired properties.

As stated above, the flexible composite section 20 is an elastomer-reinforced fabric section. The elastomer material may be selected from thermoset and thermoplastic elastomers, and will typically be chosen to be thermoset or thermoplastic in accordance with the particular matrix material chosen. Where the matrix material is a thermoset material, the elastomer material will typically be chosen to be a thermoset material. Where the matrix material is a thermoplastic material, the elastomer material will typically be chosen to be a thermoplastic material. This will facilitate the manufacturing of the composite part 10 having the flexible section 20.

In some embodiments, the elastomer material 32 is selected from polychloroprenes (e.g. Neoprene™ and Neoprene™ blends), fluoroelastomers (e.g. Viton™ and Viton™ blends), nitrile rubber (copolymer of acrylonitrile and butadiene), fluorosilicones, silicones, styrene-butadiene rubbers (SBR), SBR blends, polybutadiene, and polyisoprenes. In other embodiments, the elastomer material 32 is selected from neoprenes and vitons. The elastomer material covering and impregnating any given fabric layer may be the same or different from the elastomeric material covering and impregnating any other fabric layer.

In other embodiments, the elastomer material 32 is chosen to be a material having specific properties. In some embodiments, the elastomer material 32 is chosen to have a glass transition temperature of −40 C or below. In some embodiments, the elastomer material 32 is chosen for its flame resistance, having a self extinguishing characteristic.

In additional embodiments, the composite section 20 is chosen to be solvent resistant, and, in embodiments such as that shown here for mounting a composite part between the engine and frame of a helicopter, is particularly chosen to be resistant to aircraft cleaner, JP-5 jet fuel, distilled water, methylene chloride and methyl ethyl ketone. In other embodiments, the composite section 20 preferably has good heat aging characteristics. In other embodiments, the composite section 20 preferably exhibits a minimum tensile value of 200 lbs/in, at −40 C, 23 C and 50 C. In yet other embodiments, the composite section 20 preferably exhibits a shear modulus of less than 15,000 psi at −40 C.

In a specific embodiment of the flexible composite section 20 shown here, wherein the composite section 20 is formed between the engine 12 and frame 14 of a helicopter, the fabric layers 30a and 30b are nomex layers (synthetic aromatic polyamide) formed by a leno weave, and the elastomer material is Neoprene™ (polychloroprene), particularly Neo 5009™ or a Neoprene™ SBR blend.

As is common in the production of composite parts in the prior art, the reinforcing materials 22, 26 and matrix materials 24 are combined, compacted and processed to undergo a melding event, after which, the shape of the composite part is essentially set, though it can be deformed under certain conditions. For thermoset matrix materials, the melding event is a curing reaction initiated by the application of heat or by chemical reaction, such as by addition of an organic peroxide. For thermoplastic matrix materials, the melding event is a solidification from the melted state.

By choosing the elastomer material 32 of the flexible section 20 to be of the same type as the matrix material 24 of the first and second composite sections 16, 18, the melding event suitable for setting the shape of the first and second composite sections 16, 18 will also be suitable for establishing the final flexible section 20. When the matrix material is a thermoset material that is to undergo a curing reaction, the elastomer material is also preferably chosen to be a thermoset material so that it can be cured during the same curing step. Similarly, when the matrix material is a thermoplastic material that sets up simply by solidification, the elastomer material is also preferably chosen to be a thermoplastic material so that it can set up along with the matrix material.

The composite part 10 of this invention can be made by autoclave moulding, vacuum bag moulding, pressure bag moulding, resin transfer moulding, heated press and platen press moulding.

In general, the composite part 10 is produced as follows. A pre-melded first composite section of laminated structure is formed by introducing multiple layers of reinforcement material to a first composite mold portion. Similarly, a pre-melded second composite section of laminated structure is formed by introducing multiple layers of reinforcement material to a second composite mold portion. A pre-melded flexible section is formed to extend between the pre-melded first composite section and the pre-melded second composite section by positioning multiple layers of fabric material to overlap with the multiple layers of reinforcement material of the pre-melded first composite section and the multiple layers of reinforcement material of the pre-melded second composite section. After the above steps, the pre-melded first composite section, the pre-melded second composite section and the pre-melded flexible section are subjected to a melding event to form a composite part having a first composite section joined to a second composite section by a flexible section.

Figure 3:
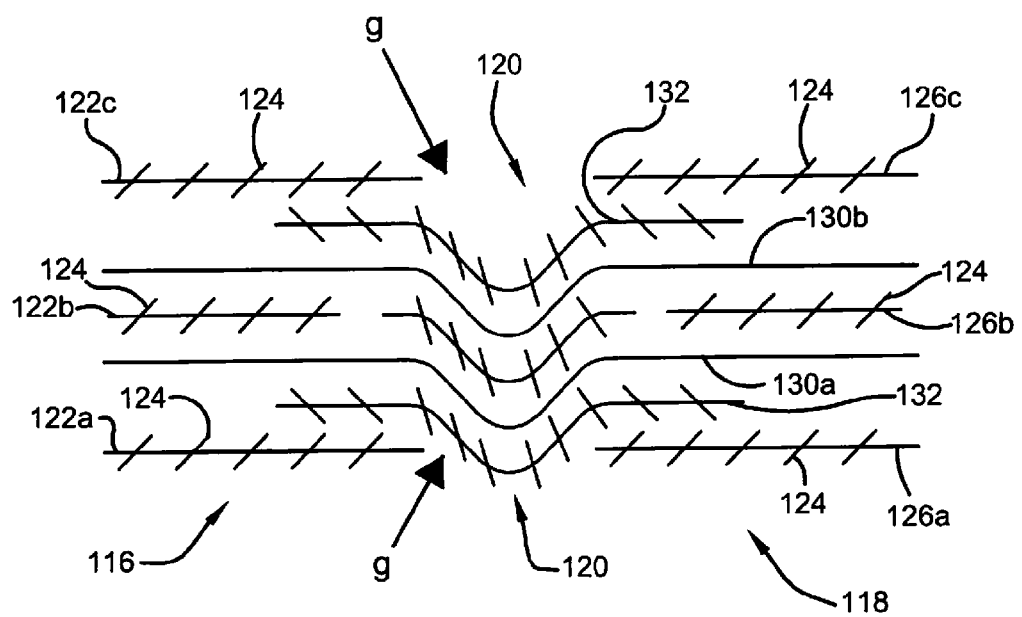
FIG. 3 is a schematic cross-sectional view as in FIG. 2 but showing an alternative embodiment.

A second embodiment for the composite section is shown schematically in FIG. 3, and is designated by the numeral 120 as part of a composite part in accordance with this invention. As seen in the cross-section of FIG. 3, the first composite section 116 and the second composite section 118 are similar to those same composite sections in the embodiment of FIG. 2, and provide a gap g spanned by the composite section 120 to join the first composite section 116 and second composite section 118. They have a laminated structure including multiple layers of reinforcement material supported by a matrix material. More particularly, the first composite section 116 includes a first layer of reinforcement material 122a, a second layer of reinforcement material 122b, and a third layer of reinforcement material 122c. At least two layers are employed, and more layers can be employed, as desired. These layers of reinforcement material 122a, 122b and 122c are sheet-like reinforcement materials, as generally connoted by the term "layers." Each of these layers of reinforcement material 122a, 122b and 122c are covered and impregnated with a matrix material 124. Similarly, the second composite section 118 includes a first layer of reinforcement material 126a, a second layer of reinforcement material 126b, and a third layer of reinforcement material 126c. These layers of reinforcement material 126a, 126b and 126c are sheet-like reinforcement materials, as generally connoted by the term "layers." Each of these layers of reinforcement material 126a, 126b and 126c are covered and impregnated with a matrix material 124. The materials chosen for the layers of reinforcement material and the matrix material are the same as those disclosed above with respect to the embodiment of FIG. 2. Each reinforcing layer may be the same or different, and will be chosen for desired properties. The matrix material covering and impregnating any given layer may be the same or different from the matrix material covering and impregnating any other layer.

The first composite section 116 and the second composite section 118 are joined by a flexible composite section 120. The flexible composite section 120 is an elastomer-reinforced fabric section, wherein multiple layers of the fabric overlap with both the first composite section 116 and the second composite section 118. In FIG. 3, the flexible composite section 120 includes a first fabric layer 130a, which extends between the first 122a and second 122b layers of reinforcement material of the first composite section 116 and between the first 126a and second 126b layers of reinforcement material of the second composite section 118. The flexible composite section 120 further includes a second fabric layer 130b, which extends between the second 122b and third 122c layers of the reinforcement material of the first composite section 116 and between the second 126b and third 126c layers of reinforcement material of the second composite section 118. The flexible composite section 20 is an elastomer-reinforced fabric section, and, thus, the first fabric layer 130a and the second fabric layer 130b are reinforced with an elastomer material 132. The materials chosen for the fabric layers and the elastomeric material are the same as those disclosed above with respect to the embodiment of FIG. 2. Each of the multiple layers of the fabric may be chosen to be the same or different, and will be chosen for desired properties. The elastomer material covering and impregnating any given fabric layer may be the same or different from the elastomeric material covering and impregnating any other fabric layer, even though only one elastomeric material 132 is shown. The processes for forming the composite part 110 is the same as those processes described above with respect to the embodiment of FIG. 2, though it will be appreciated that the manner in which the various layers and matrix and elastomer materials are laid up in a mold would change accordingly to the present interleaved concept.

EXAMPLES

A finite element analysis was conducted to compare the load experienced by a solid tubular section to that experienced by tubular section that is similar to the solid tubular section but for having a flexible section of this invention. In this experiment, the control solid tubular section was a composite formed of four layers of carbon fiber cloth surrounded and impregnated by epoxy resin. The control solid tubular section was 12 inches in diameter (outside diameter, OD), and the composite was 0.030 inches thick.

The experimental tubular section was formed of first and second solid tubular sections joined by a flexible section. The first and second solid tubular sections were composites formed the same as the control solid tubular section, and were thus formed of four layers of carbon fiber cloth surrounded and impregnated by epoxy resin. The first and second solid tubular sections were 12 inches in diameter (outside diameter, OD), and the composites were 0.030 inches thick. The flexible section was formed as disclosed above, by positioning multiple layers of leno weave nylon fabric and elastomeric material to overlap with the multiple layers of reinforcement material of the pre-melded first composite section and the multiple layers of reinforcement material of the pre-melded second composite section. The flexible section was formed approximately at the middle of the length of the experimental tubular section (i.e., the first and second solid tubular sections were approximately of the same length), and the experimental tubular section was made to be the same overall length as the control tubular section.

To compare the control solid tubular section to the experimental tubular section having a flexible section, the ends of the solid tubular section were gripped and one end was moved relative to the other to achieve a 0.4 inch deflection between the left and right ends. The load on the solid tubular section was then calculated. The same was done to the ends of the experimental tubular section. This was then repeated at a 1 inch deflection. The following table shows the results.

| | Load Comparison (pounds) | |
|---|---|---|
| | 0.4 inch deflection | 1.0 inch deflection |
| Control | 68,384 | 82,805 |
| Experimental | 196 | 775 |

Thus, it can be seen that the load to the tubular section having a flexible section in accordance with this invention is significantly reduced.

In light of the foregoing, it should be appreciated that the present invention significantly advances the art by providing a composite part that is structurally and functionally improved in a number of ways by having a flexible section. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A composite part comprising:
a first composite section having a laminated structure comprising multiple layers of reinforcement material supported by a matrix material;
a second composite section having a laminated structure comprising multiple layers of reinforcement material supported by a matrix material, said first and second composite sections being separated by a gap; and
a flexible composite section spanning said gap and joining said first composite section to said second composite section, said flexible section including multiple layers of a fabric material supported by a flexible elastomer, wherein said multiple layers of said fabric material overlap with said first composite section and said second composite section by being layered in between at least a portion of the multiple layers of reinforcement material forming the laminated structures thereof.

2. The composite part of claim 1, wherein said reinforcement material is selected from sheet-like, woven or non-woven layers of fiberglass, aramid or para-aramid fibers, carbon fibers, nylon, polyethylene, quartz, ceramic, PBO, boron, basalt and natural fibers such as hemp, jute, and flax.

3. The composite part of claim 1, wherein said matrix material is selected from thermoset polymers and thermoplastic polymers and mixtures thereof.

4. The composite part of claim 3, wherein said matrix material is selected from epoxy, polyester, vinyl ester resin, phenolic esters and cyanate esters, and mixtures of thereof.

5. The composite part of claim 4, wherein said reinforcement material is selected from fiberglass and carbon fiber.

6. The composite part of claim 1, wherein said fabric material is selected from sheet-like, woven or non-woven layers of fiberglass, aramid or para-aramid fibers, carbon fibers, nylon, polyethylene, quartz, ceramic, PBO, boron, basalt and natural fibers such as hemp, jute, and flax.

7. The composite part of claim 1, wherein said flexible elastomer is selected from thermoset and thermoplastic elastomers.

8. The composite part of claim 7, wherein said fabric material is selected from fiberglass and carbon fiber.

9. The composite part of claim 5, wherein said flexible elastomer is selected from polychloroprenes, fluoroelastomers, nitrile rubber, fluorosilicones, silicones, styrene-butadiene rubbers (SBR), SBR blends, polybutadiene, and polyisoprenes.

10. The composite part of claim 9, wherein said fabric material is selected from fiberglass and carbon fiber.

11. The composite part of claim 1, wherein:
(a) said first composite section includes a first layer of reinforcement material, a second layer of reinforcement material and a third layer of reinforcement material;
(b) said second composite section includes a first layer of reinforcement material, a second layer of reinforcement material and a third layer of reinforcement material;
(c) said flexible composite section includes a first layer of fabric material and a second layer of fabric material, said first layer of fabric material overlapping with and lying between said first and second layers of reinforcement material of said first composite section and overlapping with and lying between said first and second layers of reinforcement material of said second composite section, and said second layer of fabric material overlapping with and lying between said second and third layers of reinforcement material of said first composite section and overlapping with and lying between said second and third layers of reinforcement material of said second composite section.

* * * * *